T. A. KILLMAN.
METHOD OF AND APPARATUS FOR PROJECTING MOTION PICTURES IN COLORS.
APPLICATION FILED AUG. 8, 1919.
1,413,591.
Patented Apr. 25, 1922.
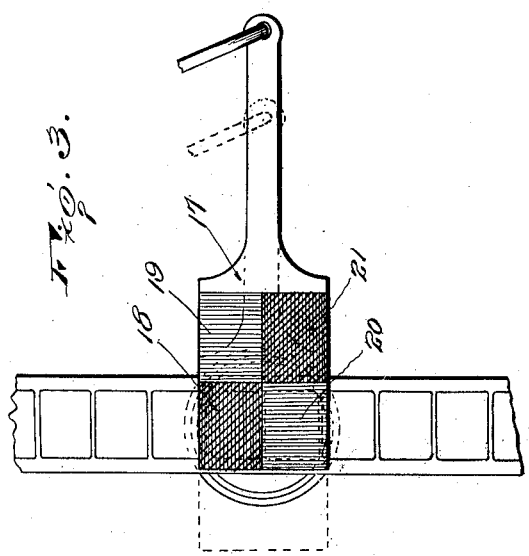
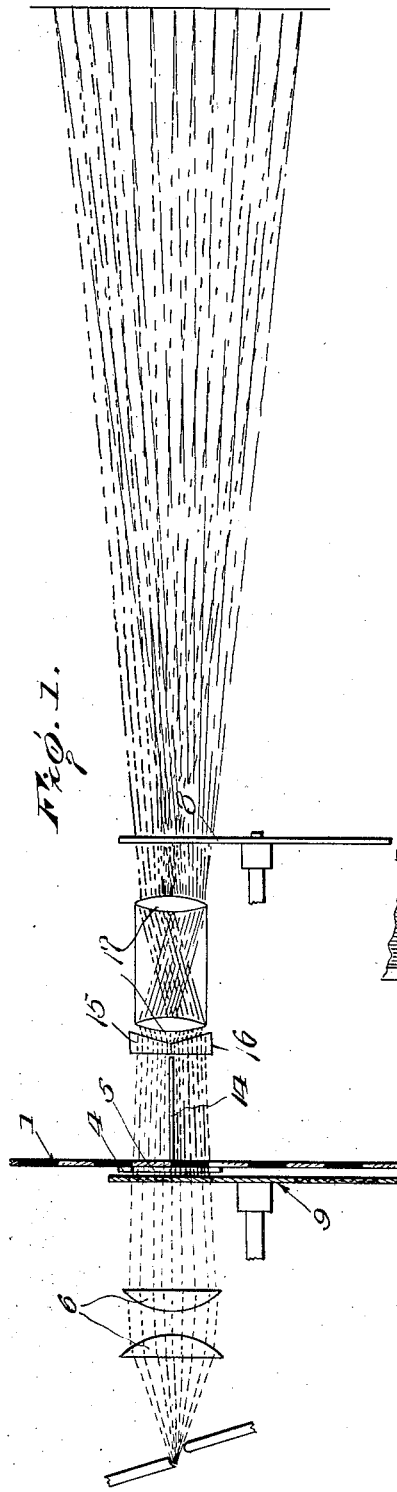
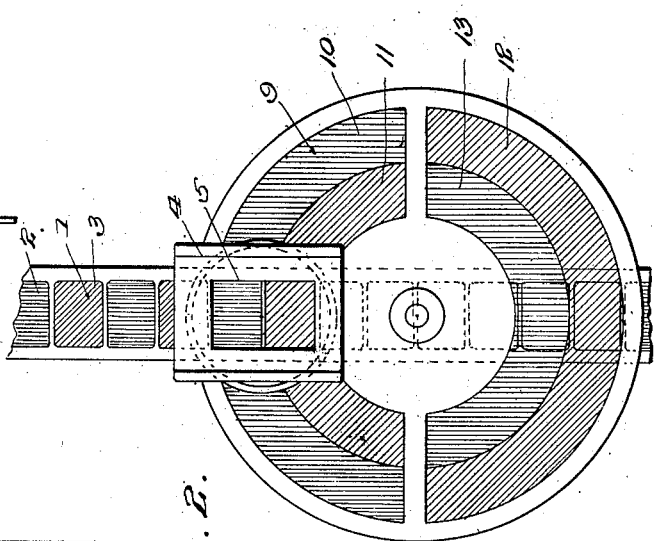
Inventor:
T. A. Killman.
by Lacy & Lacy,
Attorneys.

UNITED STATES PATENT OFFICE.

THOMAS A. KILLMAN, OF NASHVILLE, TENNESSEE.

METHOD OF AND APPARATUS FOR PROJECTING MOTION PICTURES IN COLORS.

1,413,591.  Specification of Letters Patent.  Patented Apr. 25, 1922.

Application filed August 8, 1919. Serial No. 316,134.

*To all whom it may concern:*

Be it known that I, THOMAS A. KILLMAN, a citizen of the United States, residing at Nashville, in the county of Davidson and State of Tennessee, have invented certain new and useful Improvements in Methods of and Apparatus for Projecting Motion Pictures in Colors, of which the following is a specification.

This invention relates to a method of and apparatus for projecting motion pictures in the natural colors of the objects photographed.

One of the objects of the invention is to evolve a method of projecting motion pictures in colors by which method the natural colors of the objects photographed will be faithfully reproduced, the method requiring only slight modification of the ordinary projection apparatus in order to produce the desired result.

Another object of the invention is to evolve a method of projecting motion pictures in colors by which method the colors will be simultaneously projected onto the screen and there blended, thereby eliminating the agency of persistence of vision which is essential where the images in the two different colors are not simultaneously projected onto the screen as in the ordinary methods which have heretofore been practiced. Of course, persistence of vision is a necessary agency in any method of projection in which the film is moved intermittently and this is true of the present method so far as by this agency one image is retained during the succeeding period of occultation, but this agency is not required for the purpose of retaining an image in one color until the projection of a companion image in another color, and I therefore consider that my method of projection will be less tiring to the eyes and will result furthermore in a more faithful reproduction of the images in their natural colors.

Another object of the invention is to evolve a method of projection by which each picture field is twice projected in passing through the film gate of the projection apparatus so that the action portrayed will be smoother than if the projection were accomplished by the ordinary methods in which each picture field is exposed but once in passing through the film gate.

In the accompanying drawings:

Figure 1 is a view of a diagrammatic nature illustrating the apparatus which I employ in the carrying out of my method;

Fig. 2 is a semi-diagrammatic view illustrating a portion of the apparatus;

Fig. 3 is a view illustrating a modification of the apparatus.

The film is indicated in the drawings in general by the numeral 1 and this film is printed from a negative film exposed by the well-known Urban-Smith process so that it will comprise alternate picture fields 2 and 3 representing respectively the images to be projected in red and in green light. The film gate of the projecting apparatus is indicated in general by the numeral 4 and is of the ordinary construction except that the aperture therein, indicated by the numeral 5, is of dimensions in a vertical direction to simultaneously embrace two of the picture fields of the film as clearly shown in Fig. 1 of the drawings. The film is fed through the film gate by the usual intermittent feeding means employed for this purpose and with precisely the same movement which obtains when an ordinary film is fed through a projecting apparatus. Therefore each of the picture fields of the film in entering the aperture of the film gate will first be arrested in its movement to occupy the upper portion of the said aperture and will then be shifted during the usual period of occultation, to occupy the lower portion of the said aperture and, by the means which will presently be described, the said picture field is exposed in each of its said positions so that, as before stated, it is exposed twice in passing through the gate.

Figure 1 of the drawings represents in a semi-diagrammatic manner the apparatus necessary for the carrying out of the method and in this figure the numeral 6 indicates the condensing lenses, 7 the projecting lens and 8 the usual shutter, the film and film gate being indicated by the numerals heretofore assigned to these parts.

Operating in rear of the film gate is a rotary color screen indicated in general by the numeral 9, and this color screen has an outer segment 10 which is red in color and an inner segment 11 which is green in color and concentric to the segment 10, the said segments having the extent of a half circle. The screen also comprises an outer segment 12 green in color and an inner concentric segment 13 red in color. This color screen is so positioned that it will as stated revolve in rear of the film, and through half of its cycle of revolution the color segments 10 and 11 will pass the picture fields which are respectively within the upper and lower portions of the film gate aperture 5, and through the other half of the cycle of rotation of the screen, the color segments 12 and 13 will respectively pass the picture fields which are within the upper and lower portions of the aperture of the film gate. However, the film has been moved during a period of occultation so that the picture field which formerly occupied the upper portion of the aperture of the film gate now occupies the lower portion of said aperture and while it was in the first instance projected by light rays passing through the color segment 10 it will in the latter instance be projected by light rays passing through the color segment 13.

In order that the red and green light rays passing through the film to the projecting lens set may be prevented from mingling before reaching the projecting lenses, an opaque partition element 14 is preferably disposed in a horizontal position immediately in advance of, and close to the film 1. The numerals 15 and 16 indicate two prisms disposed edge to edge in the manner shown in Fig. 1 of the drawings with their joint extending horizontally immediately in advance of the forward edge of the partition element 14 and transecting the axes of the lenses 7.

It will now be evident that the condensed rays from the lenses 6 passing through the color segments or zones of the screen 9, will pass through the film, the rays from the segment or zone 10 passing through one of the picture fields 2 and the rays from the zone 11 passing through the preceding picture field 3, the said picture fields 2 and 3 at such time occupying respectively the upper and lower portions of the aperture of the film gate. During the period of occultation the film will, of course, be shifted downwardly so that the picture field 2 will occupy the lower portion of the film gate aperture and the following picture field 3 will occupy the upper portion of said aperture and in the meantime the screen has been rotated so that the color segments 12 and 13 will respectively pass the said picture fields 3 and 2 thus exposing the picture field 2 for a second time as heretofore pointed out. The rays after passing through the film will be refracted by the prisms 15 and 16 and will be collected by the lenses 7 and projected onto the screen, the rays from the red picture field and the rays from the green picture field blending between the projection lenses and the screen so that upon the screen there will be projected a composite of the two picture fields representing the images in their natural colors.

I have previously described a rotary color screen but it will be evident that a reciprocating screen such as shown in Fig. 3 of the drawings and indicated by the numeral 17 may be employed, this screen having color zones 18 and 19 located side by side at its upper portion and respectively green and red, and other color zones 20 and 21 also located side by side but at its lower portion and respectively colored red and green. This color screen may, of course, be reciprocated in any desired manner and the results produced are precisely the same as those obtained where the rotary color screen shown in Figs. 1 and 2 is employed.

Having thus described the invention, what is claimed as new is:

In an apparatus for the projection of motion pictures in colors, the combination with a film gate having an aperture of dimensions to embrace two adjacent picture fields of a film, a partition located in advance of the said gate and transversely bisecting the aperture thereof, prisms arranged in advance of the partition and disposed edge to edge and having their meeting edges located in the plane of the said partition, the faces of the prisms which are presented toward the film gate lying in a common plane and the opposite faces thereof occupying planes converging in the direction of the meeting edges of the prisms, and a single projecting lens set arranged in advance of the prisms with its optical axis in the plane of the meeting edges of the prisms.

In testimony whereof I affix my signature.

THOMAS A. KILLMAN. [L. S.]